(12) United States Patent
Yang et al.

(10) Patent No.: US 8,218,112 B2
(45) Date of Patent: Jul. 10, 2012

(54) ACTIVE MATRIX DRIVING DISPLAY DEVICE AND IMAGE DISPLAYING METHOD USING THE SAME

(75) Inventors: Yong-Ho Yang, Seoul (KR); Dong-Ho Lee, Yongin-si (KR); Soong-Yong Joo, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 26 days.

(21) Appl. No.: 13/016,416

(22) Filed: Jan. 28, 2011

(65) Prior Publication Data

US 2011/0134376 A1 Jun. 9, 2011

Related U.S. Application Data

(63) Continuation of application No. 10/526,689, filed as application No. PCT/KR2003/001719 on Aug. 26, 2003, now Pat. No. 7,894,021.

(30) Foreign Application Priority Data

Sep. 5, 2002 (KR) .................... 10-2002-0053635

(51) Int. Cl.
*G02F 1/1333* (2006.01)
*G02F 1/1343* (2006.01)
(52) U.S. Cl. ........................ 349/110; 349/141
(58) Field of Classification Search .............. 349/110, 349/141
See application file for complete search history.

(56) References Cited

U.S. PATENT DOCUMENTS

| 5,101,289 | A | | 3/1992 | Takao et al. |
| 5,617,230 | A | * | 4/1997 | Ohgawara et al. ............ 349/110 |
| 5,907,379 | A | * | 5/1999 | Kim et al. ..................... 349/141 |
| 6,204,895 | B1 | | 3/2001 | Nakamura et al. |
| 6,246,460 | B1 | | 6/2001 | Young |
| 6,441,879 | B2 | | 8/2002 | Hiraishi et al. |
| 2002/0028305 | A1 | * | 3/2002 | Matsumoto .................... 428/1.1 |
| 2002/0113931 | A1 | * | 8/2002 | Park et al. ..................... 349/141 |

* cited by examiner

*Primary Examiner* — Brian M. Healy
*Assistant Examiner* — Mary El Shammaa
(74) *Attorney, Agent, or Firm* — F. Chau & Associates, LLC

(57) ABSTRACT

LCD device includes two substrates, a first and second color filters, two liquid crystal layers. The first color filters are formed on portions of the second substrate corresponding to border area The second color filters are formed on portions of the second substrate corresponding to the display area except the border area. A first liquid crystal layer between the first and the second substrate is comprised in border area, and a zero electric field is formed on the first liquid crystal layer so as to completely transmit light incident into the first liquid crystal layer therethrough. A borderline having various colors can be displayed by forming various patterns of color filters having various colors on portions of the second substrate corresponding to the border area under normally white mode, thereby producing picture frame effect while images are displayed on the screen.

23 Claims, 14 Drawing Sheets

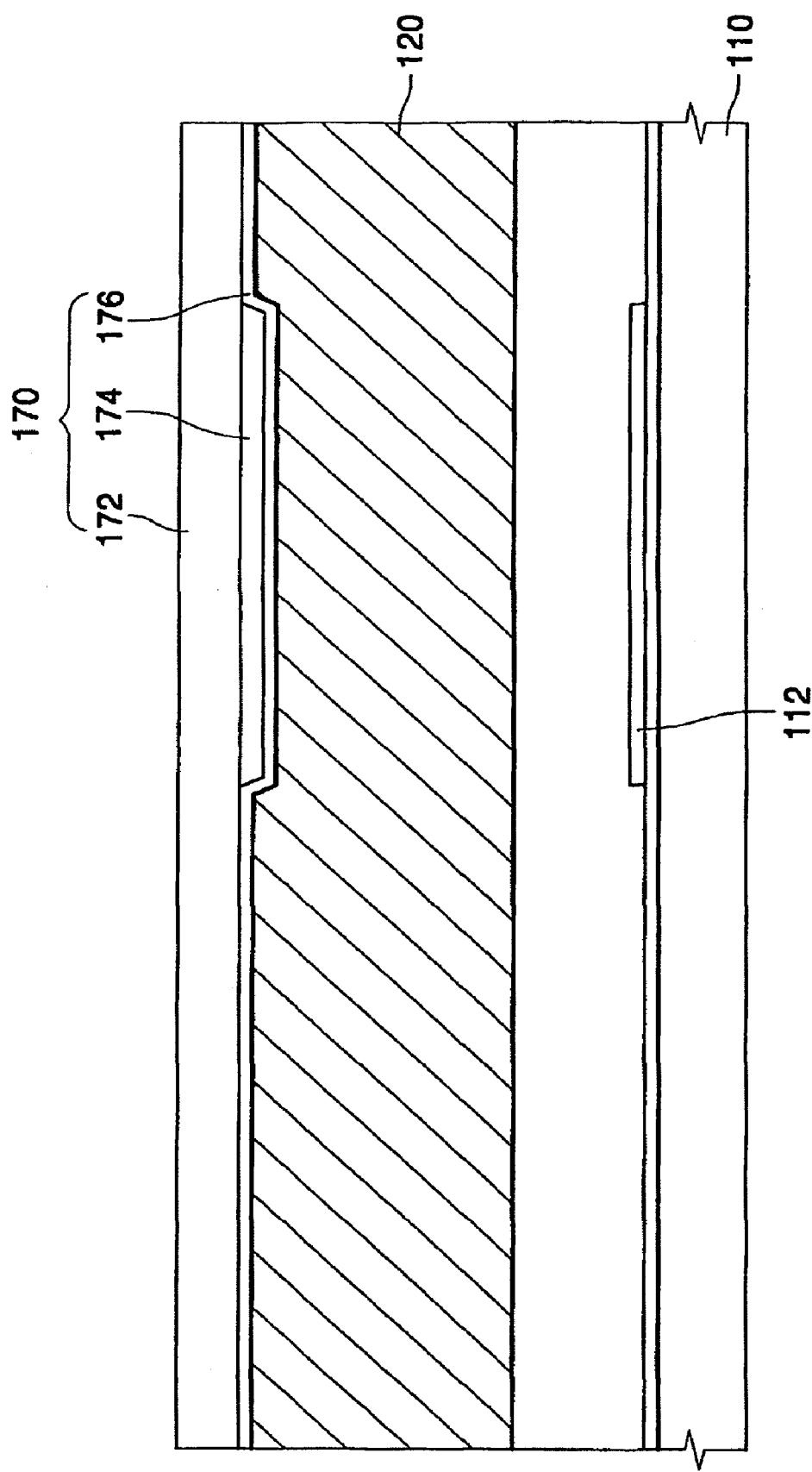

ACTIVE MATRIX DRIVING DISPLAY DEVICE AND IMAGE DISPLAYING METHOD USING THE SAME

CROSS-REFERENCE TO RELATED APPLICATIONS

This application is a Continuation of Application of U.S. patent application Ser. No. 10/526,689, filed on Mar. 3, 2005 now U.S. Pat. No. 7,894,021, which claims priority under 35 U.S.C. §119 to Korean Patent Application Number: 2002-53635, filed on Sep. 5, 2002, and under 35 U.S.C. §365 to International Patent Application Number: PCT/KR2003/001719, filed on Aug. 26, 2003, the contents of which are incorporated by reference herein in their entirety.

TECHNICAL FIELD

The disclosure relates to an active matrix display device and image displaying method using the same, and more particularly to an active matrix display device for displaying a borderline on a display screen thereof and image displaying method using the same.

BACKGROUND ART

Recently, there is an increased requirement for a flat panel display device that can be manufactured in a thin and light structure having a low power consumption compared with a CRT type display device, such as a liquid crystal display (LCD) device, an organic electroluminescent display device, plasma display panel (PDP), etc. Especially, the LCD device is a popular display device for which there is a rapidly increased demand in the world.

The LCD device can be classified into an active matrix driving display device and a passive matrix driving display device in aspects of driving method. The active matrix driving display device is driven by using switching devices, such as thin film transistors, and twisted nematic liquid crystal, and the passive matrix driving display device is driven by using super twisted nematic liquid crystal.

The active matrix driving display device requires another driving circuits in order to drive the switching devices. The active matrix driving display device can be applied to the LCD device and the organic electroluminescent display device. However, since the passive matrix driving display device does not use the switching devices such as the thin film transistors, the passive matrix driving display device does not require another driving circuits to drive the switching devices.

In the active matrix driving display device, characters, figures, images such as still images and moving pictures are displayed on a display area of the display device. Recently, there are requirements for a display device for displaying a borderline, to thereby produce neat screen effect and a picture frame effect while images are displayed on the display area of the display device.

The conventional active matrix driving display device requires another driving circuits for generating signals corresponding to the borderline or should change existing driving circuits in order to display the borderline having a predetermined color.

DISCLOSURE OF THE INVENTION

Accordingly, the present invention is provided to substantially obviate one or more problems due to limitations and disadvantages of the related art.

It is a first object of the present invention to provide an active matrix driving display device for displaying a borderline having a predetermined color without using another driving circuits and without changing existing driving circuits thereof.

It is a second object of the invention to provide an image displaying method where a borderline having a predetermined color can be displayed.

To accomplish the first object of the invention, there is provided a liquid crystal display device comprising: a first substrate; a second substrate being opposite to the first substrate; a first color filter formed on a first portion of the second substrate, the first portion corresponding to a first area of a display area, the first area being a border area of the display area; a second color filter formed on a second portion of the second substrate, the second portion corresponding to a second area of the display area, the second area being the display area except the border area; a first liquid crystal layer disposed between the first and the second substrate in the first area, and a zero electric field being formed on the first liquid crystal layer so as to transmit all of a light incident into the first liquid crystal layer therethrough; a second liquid crystal layer disposed between the first and the second substrate in the second area.

In another aspect of the invention, there is provided an active matrix driving display device comprising: a timing controller generating a first dummy line data, a second dummy line data, a first dummy pixel data and a second dummy pixel data, receiving a first display area data to generate a second display area data that is obtained by adding the first and second dummy pixel data to the first display area data, and generating a first control signal that allows the second display area data and the second dummy line data to be outputted to each row of a display area having a plurality of rows and columns, the first dummy line data having a first color information for each pixel in a first border area corresponding to an upper borderline, the second dummy line data having a second color information for each pixel in a second border area corresponding to a lower borderline opposite to the upper borderline, the first dummy pixel data having a third color information for each pixel in a third border area corresponding to a left borderline, the second dummy pixel data having a fourth color information for each pixel in a fourth border area corresponding to a right borderline, the first display area data having a fifth color information for each pixel in the display area except the upper, lower, left and right borderline; a first driver generating a first dummy line driving signal and a second dummy line driving signal base on the first control signal and generating a plurality of second control signals base on the first control signal, the first dummy line driving signal allowing the first dummy line data to be displayed on the first border area, the second dummy line driving signal allowing the second display area data to be displayed in a row unit on the display area except the upper, lower, left and right borderline; a second driver receiving the first dummy line data, the second display area data and the second dummy line data from the timing controller and allowing the first dummy line data, the second display area data and the second dummy line data to be displayed on the display area in response to the first dummy line driving signal, the second control signals and the second dummy line driving signal.

To accomplish the first object of the invention, there is provided an image displaying method comprising: providing a first liquid Crystal layer disposed in a first area with a first light, the first area being a border area of a display area, and a zero electric field being formed on the first liquid crystal layer; transmitting the first light through the first liquid crystal layer to provide a first color filter layer in the first area with a second light, the second light being the transmitted first light; transmitting the second light through the first color filter layer to display a borderline in the first area, a color of the borderline depending on the color of the first color filter layer; providing a second area of the display area with a third light, the second area being the display area except the border area; transmitting the third light through a second liquid crystal layer in the second area to provide a second color filter layer in the second area with a fourth light, the fourth light being the transmitted third light; and transmitting the fourth light through the second color filter layer to output an modulated light on the second area, a color of the modulated light depending on the color of the color filter layer.

In another aspect of the invention, there is provided an image displaying method comprising: generating a first dummy line data including a first color information for each pixel in a first border area of a display area having a plurality of rows and columns; generating a second dummy line data including a second color information for each pixel in a second border area opposite to the first border area; generating a first dummy pixel data including a third color information for each pixel in a third border area, the third border area being perpendicular to the first border area and having a first width; generating a second dummy pixel data including a fourth color information for each pixel in a fourth border area, the fourth border area being opposite to the third border area and having a second width; receiving first display area data to generate second display area data that are obtained by adding the first dummy pixel data to the first display area data, the first display area data having a fifth color information for each pixel in the display area except the first, second, third and fourth border area; generating a third display area data that is obtained by adding the second dummy pixel data to the second display area data; and sequentially displaying the first dummy line data, the second display area data and the second dummy line data row-by-row on the display area.

According to above present invention, the active matrix driving display device can display a borderline having a color determined by a user's favorable color.

In addition, the active matrix driving display device can display a borderline having various colors by forming various patterns of color filters having various colors on portions of the second substrate corresponding to the borderline under normally white mode.

In addition, in the active matrix driving display device, the display area can be divided clearly into the borderline and an area where images are displayed by displaying the borderline on a screen of the active matrix driving display device, to thereby produce picture frame effect while images are displayed on the screen.

BRIEF DESCRIPTION OF THE DRAWINGS

The above and other advantages of the present invention will become more apparent by describing in detail exemplary embodiments thereof with reference to the accompanying drawings, in which:

FIGS. 6A, 6B and 6C are sectional views showing an LCD panel including the thin film transistor shown in FIGS. 5A, 5B and 5C;

BEST MODE FOR CARRYING OUT THE INVENTION

Figure 1:
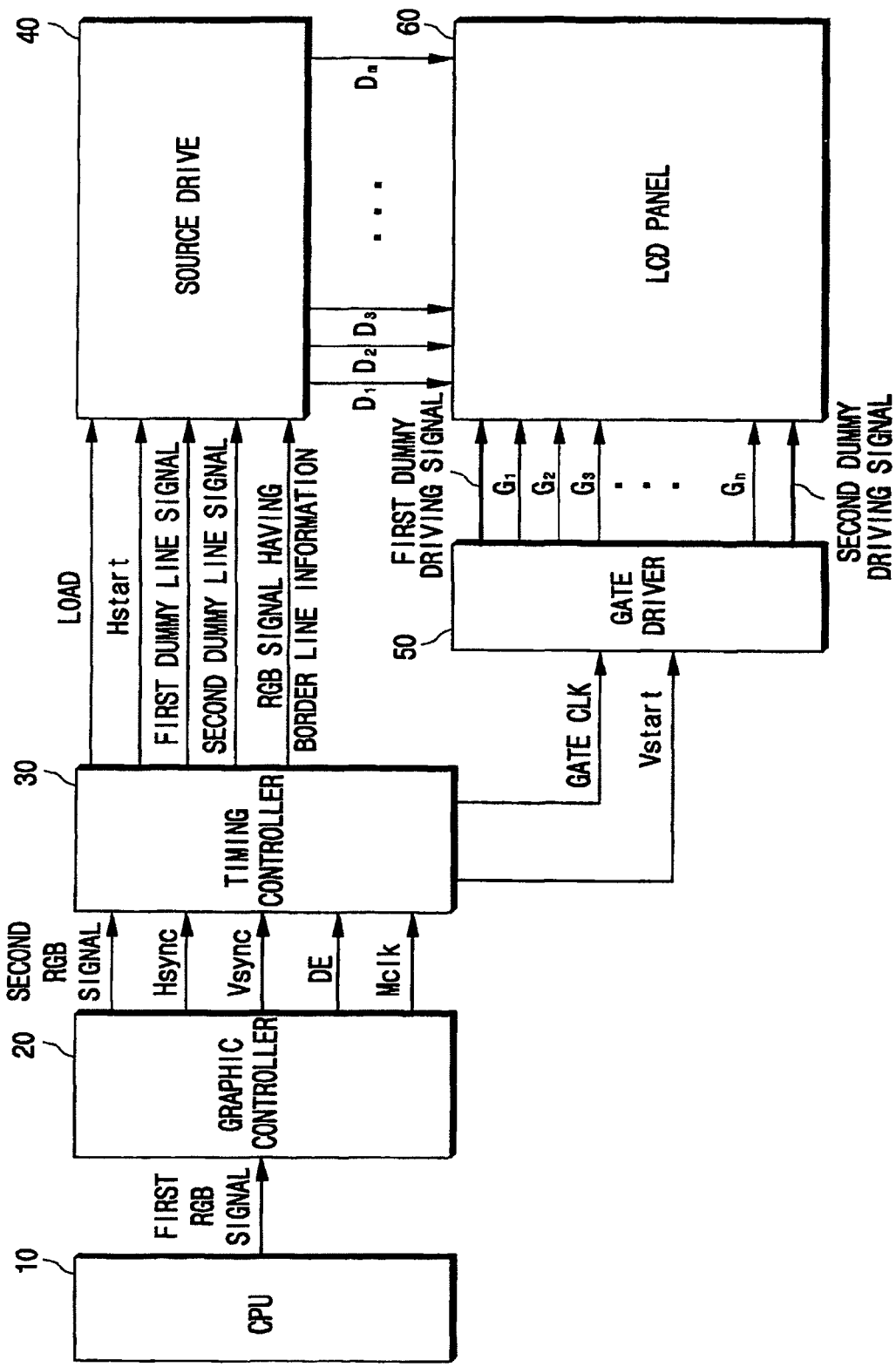
FIG. 1 is a schematic block diagram showing an LCD device for displaying a borderline on a display screen of an LCD panel according to one exemplary embodiment of the present invention.

FIG. 1 is a schematic block diagram showing an LCD device for displaying a borderline on a display screen of an LCD panel according to one exemplary embodiment of the present invention.

Referring to FIG. 1, the LCD device for displaying the borderline includes a central processing unit (CPU) 10, a graphic controller 20, a timing controller 30, a source driver 40, a gate driver 50 and an LCD panel 60.

For example, a first RGB signal outputted from the CPU 10 is applied to the graphic controller 20 and the timing controller 30, and borderline information is added to the first ROB signal in the timing controller 30. Then, the first RGB signal having the borderline information is applied to the LCD panel 60 by the source driver 50 through a plurality of data lines (D1, D2, ..., Dm) at an appropriate timing. The RGB signal includes red, green and blue color information.

The graphic controller 20 receives the first RGB signal from the CPU 10 and generates a second RGB signal, Vsync, Hsync, DE (Data Enable) and Mclk (Main Clock) signals to provide the timing controller 30 with the second RGB signal, Vsync, Hsync, DE and Mclk signals. The second RGB signal an RGB signal having same color information as the first RGB signal. The Vsync signal is a vertical synchronization signal that identifies a beginning point of each frame base on the first RGB signal. The Hsync signal is a horizontal synchronization signal that identifies each line of each frame base on the first RGB signal. The DE signal maintains a high level only during a period in which image data are outputted, and the Mclk signal a main clock signal.

The timing controller 30 receives the second RGB signal, Hsync, Vsync, DE and Mclk signals and generates a source driving signal for driving the source driver 40 and a gate driving signal for driving the gate driver 50. The source driving signal includes a LOAD, Hstart, RGB signal having the borderline information, and the gate driving signal includes a gate clk and Vstart signal.

The timing controller 30 generates a first dummy line signal and a second dummy line signal. The first and the second dummy line signal have information for the borderline corresponding to a first line and a last line of the display area, respectively. In addition, the timing controller 30 adds information for the borderline corresponding to a left and right borderline of the display area into the received second RGB signal and generates an RGB signal having borderline information. For example, borderline information may have RGB color information corresponding to borderlines such as a top, bottom, left and right borderline.

The Hstart signal is a signal that indicates a beginning point of time when the RGB signal having the borderline information outputted from the timing controller 30 is applied to the source driver 40. The source driver 40 converts digital signals of the first dummy line signal, the second dummy line signal and the RGB signal having the borderline information into analog signals. The analog signals of the first dummy line signal, the second dummy line signal and the RGB signal are applied to the LCD panel 60 in response to the LOAD signal.

The first dummy line signal, the second dummy line signal and the RGB signal are applied to the LCD panel 60 in response to the LOAD signal under the control of the timing controller 30.

The source driver 40 outputs a data line driving signals (D1, D2, . . . , Dm) for driving liquid crystal in the LCD panel 60 to each of the data lines of the LCD panel 60 based on the source driving signal (LOAD, Hstart, RGB signal having the borderline information) outputted from the timing controller 30.

The gate driver 50 outputs a first dummy line driving signal, gate line driving signals (G1, G2, . . . , Gn) and a second dummy line signal to each of the gate lines of the LCD panel 60 based on the gate driving signal (gate clk, Vstart) outputted from the timing controller 30. The first dummy line driving signal, the gate line driving signals (G1, G2, . . . , Gn) and the second dummy line signal control turn-on and turn-off of thin film transistors through gate terminals of the thin film transistors based on the gate driving signal (gate elk, Vstart). The first dummy line driving signal, gate line driving signals (G1, G2, . . . , Gn) and the second dummy line signal is sequentially applied to each of the gate lines of the LCD panel 60 by a clock signal or the gate clk. Hereinafter, the first dummy line driving signal, gate line driving signals (G1, G2, . . . , Gn) and the second dummy line signal is defined as a gate driving signal. For example, when the LCD panel has a rectangular shape of display area, the first and the second dummy line driving signals drive gate lines of the thin film transistors corresponding to the top and bottom borderlines, respectively.

The Vstart signal indicates a beginning point of the gate driving signal that is inputted to the gate lines of the LCD panel 60 from the gate driver 50.

The LCD panel 60 includes a plurality of gate lines (not shown), a plurality of data lines (not shown) intersecting the gate lines, thin film transistors (refer to FIG. 5A and FIG. 6A, etc.), liquid crystal capacitors (Clc, refer to FIG. 5A) and storage capacitors (Cst).

The thin film transistors are arranged in a matrix shape in a region that is surrounded by the gate lines and the data lines, and the thin film transistors are connected to the gate lines and the data lines. The liquid crystal capacitor transmits light in response to a voltage of the data line driving signal when the thin film transistor is turned on. The storage capacitor accumulates data line driving signal (D1, D2, . . . , Dn) when the thin film transistor is turned on, and applies the accumulated data line driving signal (D1, D2, . . . , Dn) to the liquid crystal capacitor when the thin film transistor is turned off.

The driving circuits of the LCD device for displaying the borderline can be applied not only to the LCD device but also can be applied to other flat panel display device such as the electroluminescent display device by a minor variation of the driving circuit.

Figure 2:
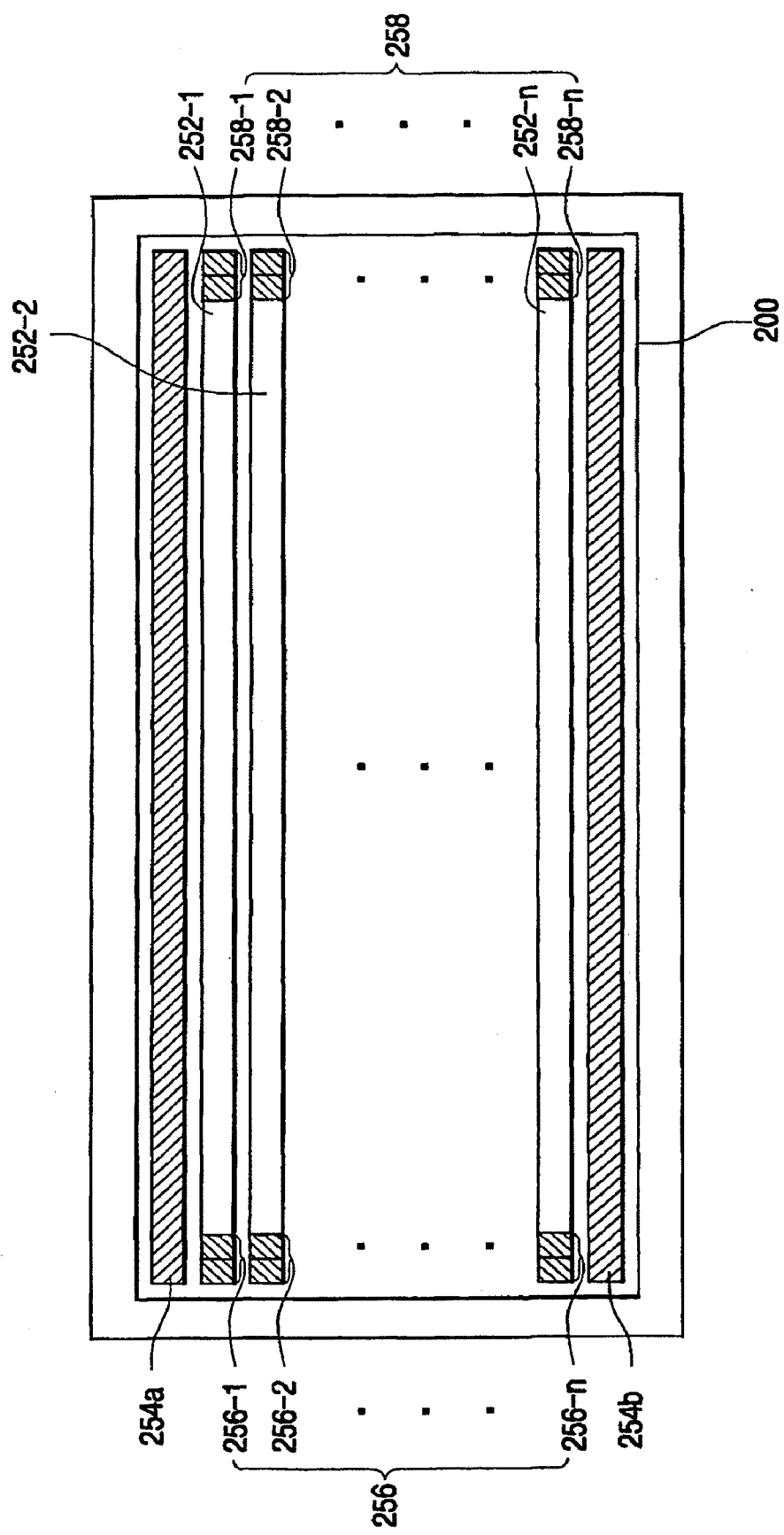
FIG. 2 is a view showing a display screen of an LCD panel in which the borderline is being displayed by means of the LCD device of FIG. 1.

FIG. 2 is a view showing a display screen of an LCD panel in which the borderline is being displayed by means of the LCD device of FIG. 1.

Referring to FIG. 2, the display area 200 is divided into a first area and a second area. The borderlines are formed on the first area. The second area is a remaining area of the display area except the first area, and images are displayed on the second area.

The first area includes a first border area 254a representing a top borderline, a second border area 254b representing a bottom borderline, a third border area (256-1, 256-2, . . . , 256-n; hereinafter refer to 256) representing a left borderline, a fourth border area (258-1, 258-2, . . . , 258-n; hereinafter refer to 258) representing a right borderline.

The first border area 254a has a thickness no less than a pixel, and the thickness of the first border area 254a can be regulated by a user. For example, a button for regulating the thickness of the first border area 254a may be on an outside of an LCD module. In addition, a thickness selection menu, for example an icon, may be displayed on a display screen of the LCD device, so that users can select a thickness of the first border area 254a by clicking the thickness selection menu. The second, third and fourth border areas (254b, 256, 258) may have the same thickness as that of the first border area 254a or can be regulated to have a thickness different from that of the first border area 254a.

The second area of the display area 200 except the borderlines may be comprised of n lines.

Figure 3:
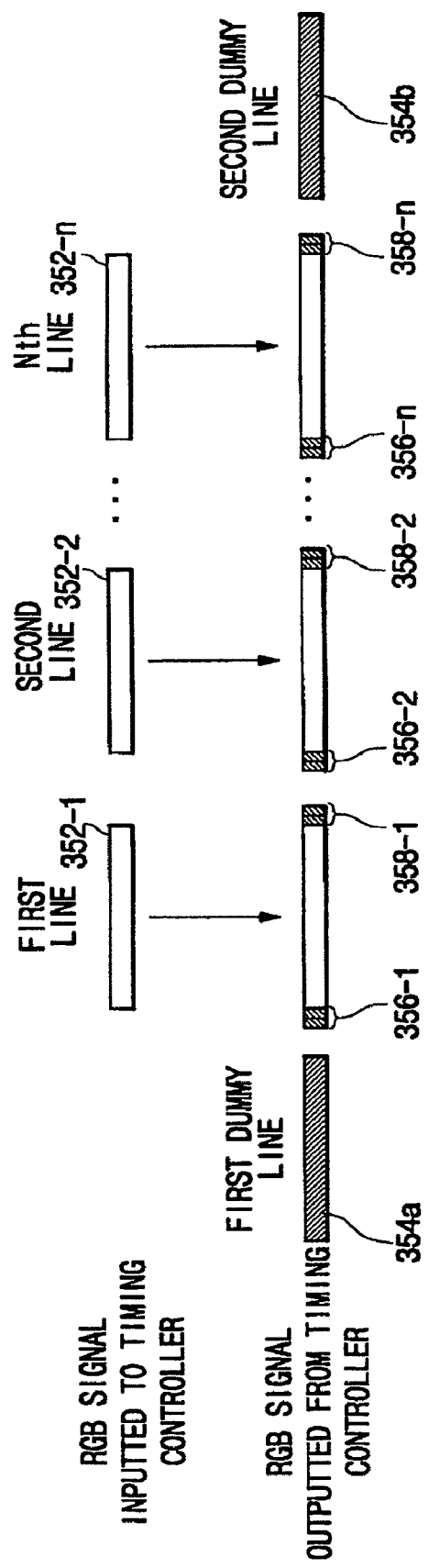
FIG. 3 is a view showing R.G.B. signals applied to the LCD panel so as to display the borderline by means of the LCD device of FIG. 1.

FIG. 3 is a view showing R.G.B. signals applied to the LCD panel so as to display the borderline by means of the LCD device of FIG. 1.

Referring to FIG. 3, the LCD panel 60 receives a first line RGB signal 352-1, a second line RGB signal 352-2, . . . , and (n) th line RGB signal 352-n from the timing controller 30. The first line RGB signal 352-1 provides image data displayed on a first line in the second area of the display area 200, the second line RGB signal 352-2 provides image data displayed on a second line in the second area of the display area 200, and the (n) th line RGB signal 352-n provides image data displayed on a n) th line in the second area of the display area 200. The image data indicates a data displayed on the display area except a data displayed on the borderline.

The timing controller 30 generates a first dummy line signal for displaying a borderline on the first border area 254a and a second dummy line signal for displaying a borderline on the second border area 254b.

In addition, the timing controller 30 adds dummy pixel signal for displaying the borderline on the third border area 256 such as a first line dummy pixel signal 356-1, a second line dummy pixel signal 356-2, . . . , (n) th line dummy pixel signal 356-n (hereinafter refer to a first dummy pixel signal 356 for displaying the borderline on the third border area 256) to one end of a first line RGB signal 352-1, a second line RGB signal 352-2, . . . , a (n) th line RGB signal 352-n, respectively.

In addition, the timing controller 30 adds dummy pixel signal for displaying the borderline on the fourth border area 258 such as a first line dummy pixel signal 358-1, a second line dummy pixel signal 358-2, ..., (n) th line dummy pixel signal 358-n (hereinafter refer to a first dummy pixel signal 358 for displaying the borderline on the fourth border area 258) to the other end of the first line RGB signal 352-1, the second line RGB signal 352-2, ..., the (n) th line RGB signal 352-n, respectively.

The timing controller 30 adds the first, second dummy line signal, a plurality of dummy pixel signals for displaying the borderlines to the first line RGB signal 352-1, the second line RGB signal 352-2, ..., the (n) th line RGB signal 352-n, to thereby display the borderlines on the LCD panel.

Hereinafter, there is described the process for applying image data to the LCD panel 60 through a source driver 40 in order to display the borderline.

Figure 4:
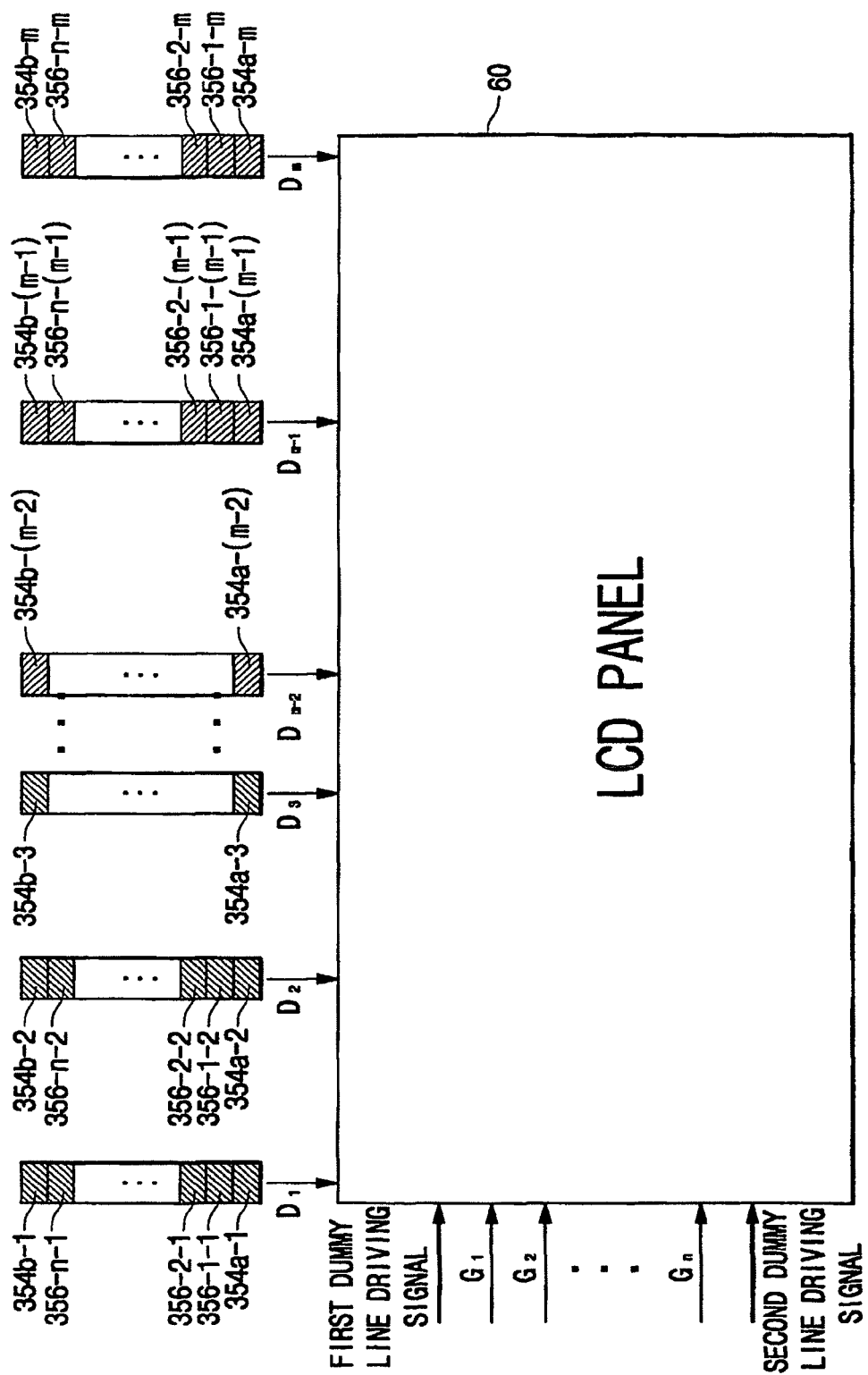
FIG. 4 is a view showing R.G.B. signals applied to the LCD panel through a source driver so as to display the borderline by means of the LCD device of FIG. 1.

FIG. 4 is a view showing R.G.B. signals applied to the LCD panel through a source driver so as to display the borderline by means of the LCD device of FIG. 1.

Referring to FIG. 4, when a first dummy line driving signal is applied to each gate line disposed in a first row of the LCD panel 60 from the gate driver 50, signals (354-a-1, 354-a-2, 354-a-3, ..., 354-a-(m−2), 354-a-(m−1), 354-a-m) corresponding to first row signals of the data line driving signals (D1, D2, ..., Dm) is outputted to each of the m data lines corresponding to the first row. Accordingly, the first borderline is displayed on the display area 70.

Then, when a first gate line driving signal G1 is applied to each gate line disposed in a second row of the LCD panel 60 from the gate driver 50, signals (356-1-1, 356-1-2, 356-1-3, ..., 356-1-(m−1), 356-1-m) corresponding to second row signals of the data line driving signals (D1, D2, ..., Dm) is outputted to each of the m data lines corresponding to the second row. Accordingly, portions of the third and fourth borderlines, and a first line RGB signal 352-1 is displayed on the second row of the display area 70.

When a second gate line driving signal G2 is applied to each gate line disposed in a third row of the LCD panel 60 from the gate driver 50, signals (356-2-1, 356-2-2, 356-2-3, ..., 356-2-(m−1), 356-2-m) corresponding to third row signals of the data line driving signals (D1, D2, ..., Dm) is outputted to each of the m data lines corresponding to the third row. Accordingly, portions of the third and fourth borderlines, and a second line RGB signal 352-2 is displayed on the third row of the display area 70.

According to above method, image data are displayed on a fourth, fifth, ..., (n−2) th row of the LCD panel. Then, when a (n) th gate line driving signal Gn is applied to each gate line disposed in a (n+1) th row of the LCD panel 60 from the gate driver 50, signals (356-n-1, 356-n-2, 356-n-3, ..., 356-n-(m−1), 356-n-m) corresponding to (n+1) th row signals of the data line driving signals (D1, D2, ..., Dm) is outputted to each of the m data lines corresponding to the (n+1) th row.

Finally, when a second dummy line driving signal is applied to each gate line disposed in a (n+2) th row of the LCD panel 60 from the gate driver 50, signals (354-b-1, 354-b-2, 354-b-3, ..., 354-b-(m−2), 354-b-(m−1), 354-b-m) corresponding to the (n+2) th row signals of the data line driving signals (D1, D2, ..., Dm) is outputted to each of the m data lines corresponding to the (n+2) th row. Accordingly, the second borderline is displayed on the display area 70. Heretobefore, a method for displaying the borderline by using control signals, such as the dummy line signals and the dummy pixel signals, of the timing controller 30 used in a driver circuit for driving the LCD panel 60. In the above case, the timing controller 30 should generate the dummy line signals and the dummy pixel signals in addition to the conventional control signals for driving the LCD panel 60.

Hereinafter, there is described a method for displaying the borderline by using color filters and liquid crystal in a normally white mode.

In the normally white mode, all light being incident into the liquid crystal interposed between a TFT substrate and a color filter substrate is transmitted completely. In order to achieve the normally white mode, electric field should not be formed on the liquid crystal, so that the liquid crystal may transmit all light being incident into the liquid crystal of the LCD device. In other words, zero electric field is formed on the liquid crystal.

In addition, the borderline having predetermined colors can be displayed by allowing no signals to be transmitted to pixel electrodes of the TFT substrate corresponding to the border area in the normally white mode while color filters are formed on portions of the color filter substrate corresponding to the color filter substrate of the LCD panel 60.

In order that no signals, such as image data, may be transmitted to pixels of the TFT substrate corresponding to the border area, for example, no thin film transistors may be formed on portions of the TFT substrate corresponding to the borderline, or the pixel electrodes of the TFT substrate corresponding to the borderline may be Maintained to be electrically disconnected with the thin film transistors of the TFT substrate corresponding to the borderline.

The normally white mode can be formed when pixels of the TFT substrate corresponding to the border area have failures. Signals applied to the source electrodes of the thin film transistors cannot be transmitted to the pixels of the TFT substrate corresponding to the border area when patterns, for example gate electrode pattern of the thin film transistor, are not formed due to foreign substance generated from photolithography process, or when the drain electrode of the thin film transistor is not electrically connected to the pixel electrode through contact hole. The pixel failure may be used so as to display the borderline on the LCD panel. Since the borderline can be displayed even when pixel failure occurs on the pixels of the TFT substrate corresponding to the borderline, the active matrix driving display device and image displaying method for displaying the borderline have strong resistance to process failure in an LCD fabrication process.

Figure 5A:
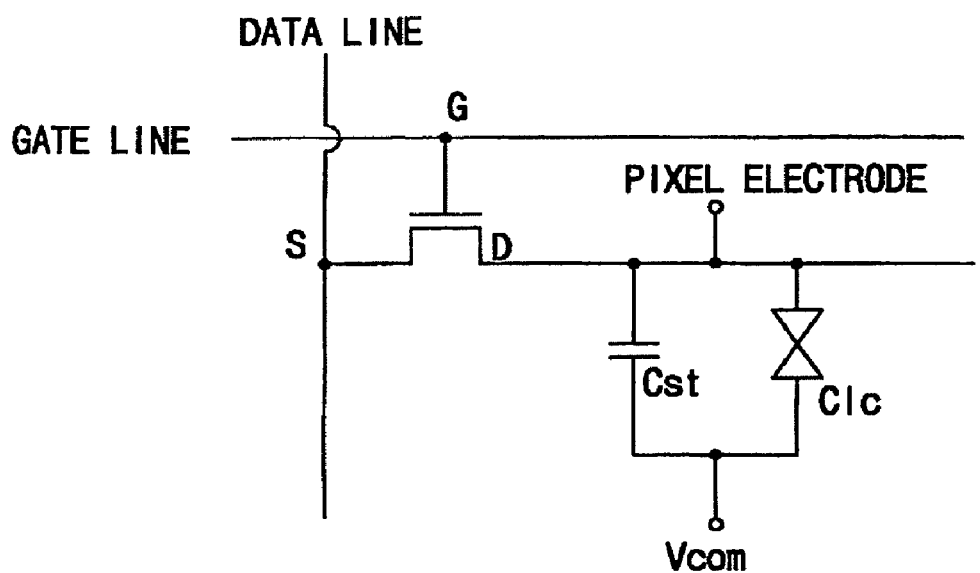
FIGS. 5A, 5B and 5C are equivalent circuit diagrams showing a thin film transistor corresponding to the borderline of the LCD panel so as to display the borderline according to exemplary embodiments of the present invention.
Figure 5B:
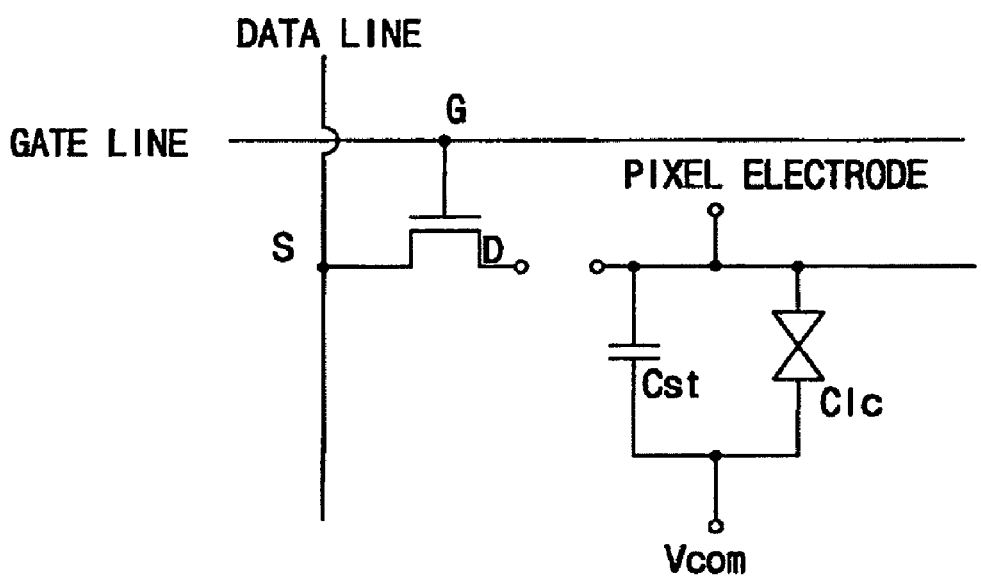
Figure 5C:
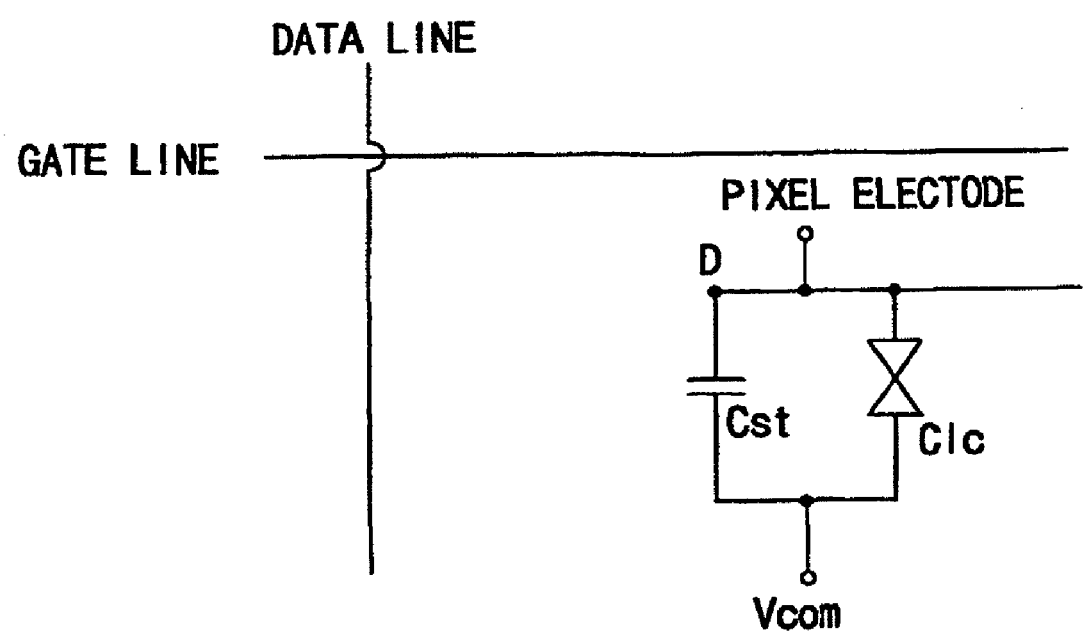
Figure 6A:
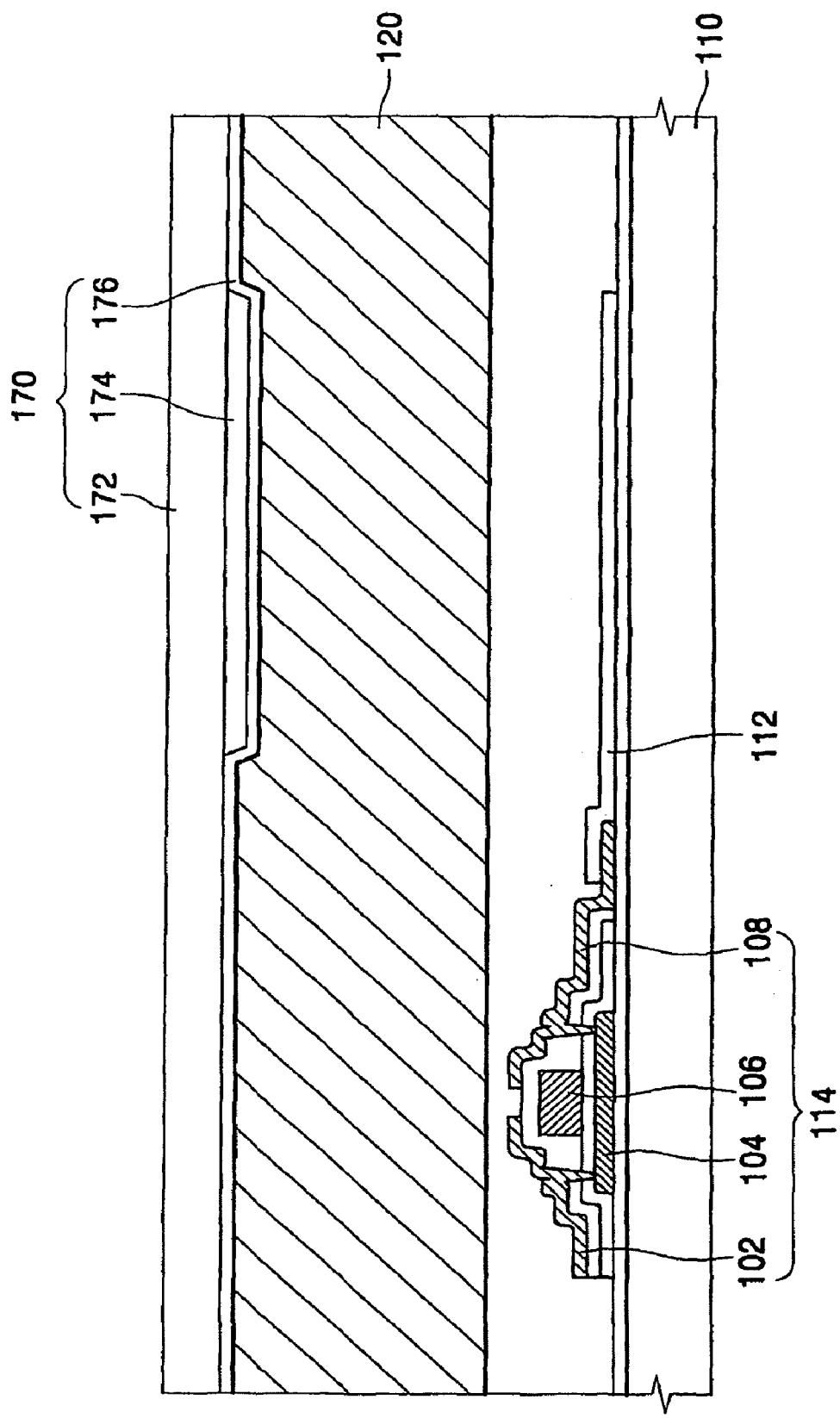
Figure 6B:
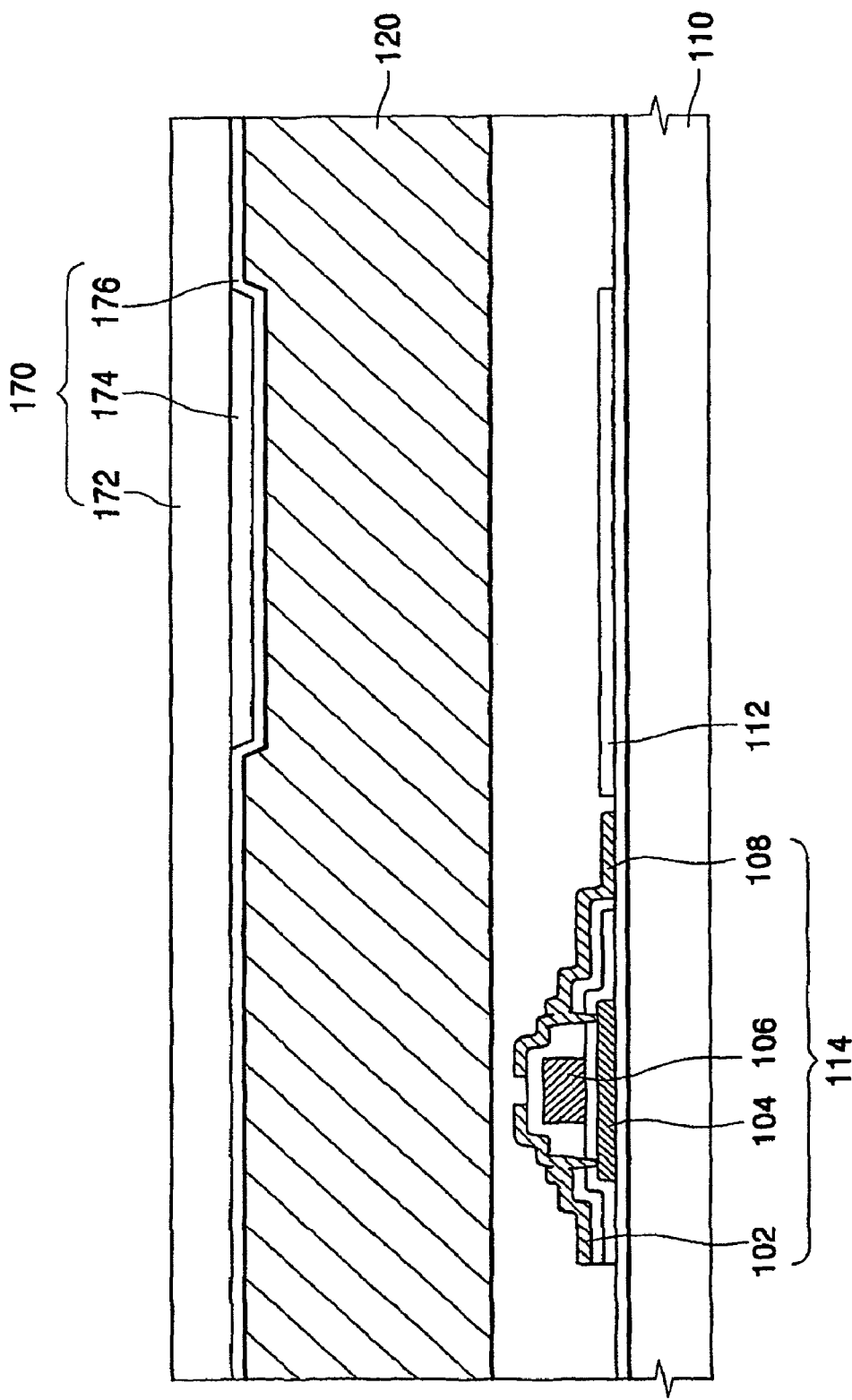

FIGS. 5A, 5B and 5C are equivalent circuit diagrams showing a thin film transistor corresponding to the borderline of the LCD panel so as to display the borderline according to exemplary embodiments of the present invention. FIGS. 6A, 6B and 6C are sectional views showing an LCD panel including the thin film transistor shown in FIGS. 5A, 5B and 5C.

Referring to FIG. 5A and FIG. 6A, a gate line formed on the LCD panel 60 is connected to a gate electrode of the thin film transistor, and a data line is connected to a source electrode of the thin film transistor.

One end of the liquid crystal layer 120 is contacted to drain electrodes 108 of the thin film transistors that are electrically connected to the pixel electrode 112, and the other end of the liquid crystal layer 120 is contacted to a common electrode 176 of the color filter substrate 170, to thereby complete the liquid crystal capacitor (Clc). The liquid crystal capacitor transmits light in response to a voltage of the data line driving signal inputted through the drain electrode 108 when the thin film transistor is turned on.

The storage capacitor is connected to the liquid crystal capacitor in parallel, accumulates data line driving signal (D1, D2, ..., Dn) when the thin film transistor is turned on, and applies the accumulated data line driving signal (D1, D2, ..., Dn) to the liquid crystal capacitor when the thin film transistor is turned off.

As shown in FIG. 6A, the gate electrode 106 is formed on a channel layer 104 of the TFT substrate, the drain electrode 108 and the source electrode 102 is formed on the gate electrode 106. The source electrode 102 is electrically connected to the drain electrode 108 through the channel layer 104. The pixel electrode 112 is formed after the drain electrode 108 is formed, and a portion of the pixel electrode 112 is electrically connected to the drain electrode 108.

Color filters 174 are formed on a transparent substrate 172 of the color filter substrate 170 so as to be opposite to the pixel electrode 112, and the common electrode 174 is formed on the color filters 174. The data line driving signal inputted through the source driver 40 is applied to pixel electrode 112 through the source electrode 102 and the drain electrode 108. While a predetermined voltage is applied to the common electrode 176, each of the liquid crystal molecules in the liquid crystal layer 120 is rearranged according to a direction of the electric field formed between the common electrode 176 and the pixel electrode 112. The amount of light that transmits the liquid crystal layer depends on the intensity of the electric field because a degree of the rearrangement of the liquid crystal molecules varies according to the intensity of the electric field. The light that transmits the liquid crystal layer 120 passes through the color filters 174, and displays color corresponding to the RGB color of the color filters 174.

In order that no signals, such as image data, may be transmitted to pixels of the TFT substrate corresponding to the border area, for example, the thin film transistors 114 of the pixels corresponding to the borderline may be maintained to be electrically disconnected with the pixel electrodes of the pixels corresponding to the borderline.

According to a first method, the gate electrode of the thin film transistor of the pixel corresponding to the border area may be not connected to the gate line, but be connected to the ground. Accordingly, the thin film transistor 114 is turned off, and the image data outputted from the data line is not transmitted to the pixel electrode 112. In addition, the pixel electrode 112 is electrically connected to the common electrode 176 so as to maintain the electric potential difference between the pixel electrode 112 and the common electrode 176 to be zero. Thus, the normally white mode can be maintained, and the light that transmits the liquid crystal passes through the color filter 174 formed on the color filter substrate 170, to thereby display the borderline having a predetermined color determined by the color filter 174.

According to a second method, as shown in FIG. 5B, the potential difference between the pixel electrode 112 and the common electrode 176 is maintained to be zero, and the drain electrode of the thin film transistor 114 of the pixel corresponding to the borderline is maintained to be open circuit. Thus, since the image data outputted from the data line is not transmitted to the pixel electrode 112, the light that transmits the liquid crystal in the normally white mode passes through the color filter 174 formed on the color filter substrate 170, to thereby display the borderline having a predetermined color determined by the color filter 174.

FIG. 6B is a sectional view showing the LCD panel 60 when the drain electrode of the thin film transistor 114 of the pixel corresponding to the borderline is maintained to be open circuit.

Referring to FIG. 6B, the pixel electrode 112 is not electrically connected to the drain electrode 108 so as to maintain the drain electrode of the thin film transistor 114 to be open circuit.

According to a third method, as shown in FIG. 5C, the potential difference between the pixel electrode 112 and the common electrode 176 is maintained to be zero, and the thin film transistor of the pixel corresponding to the borderline is not formed on the TFT substrate 110. Thus, since the image data outputted from the data line is not transmitted to the pixel electrode 112, the light that transmits the liquid crystal in the normally white mode passes through the color filter 174 formed on the color filter substrate 170, to thereby display the borderline having a predetermined color determined by the color filter 174.

FIG. 6C is a sectional view showing the LCD panel 60 when the thin film transistor 114 of the pixel corresponding to the borderline is not formed on the TFT substrate 110. In addition, the pixel electrode 112 also may be not formed on the TFT substrate 110. On the other hand, while the thin film transistor 114 of the pixel corresponding to the borderline is formed on the TFT substrate 110, the pixel electrode 112 is not formed on the TFT substrate 110, to thereby display the borderline having a predetermined color determined by the color filter 174.

Figure 7:
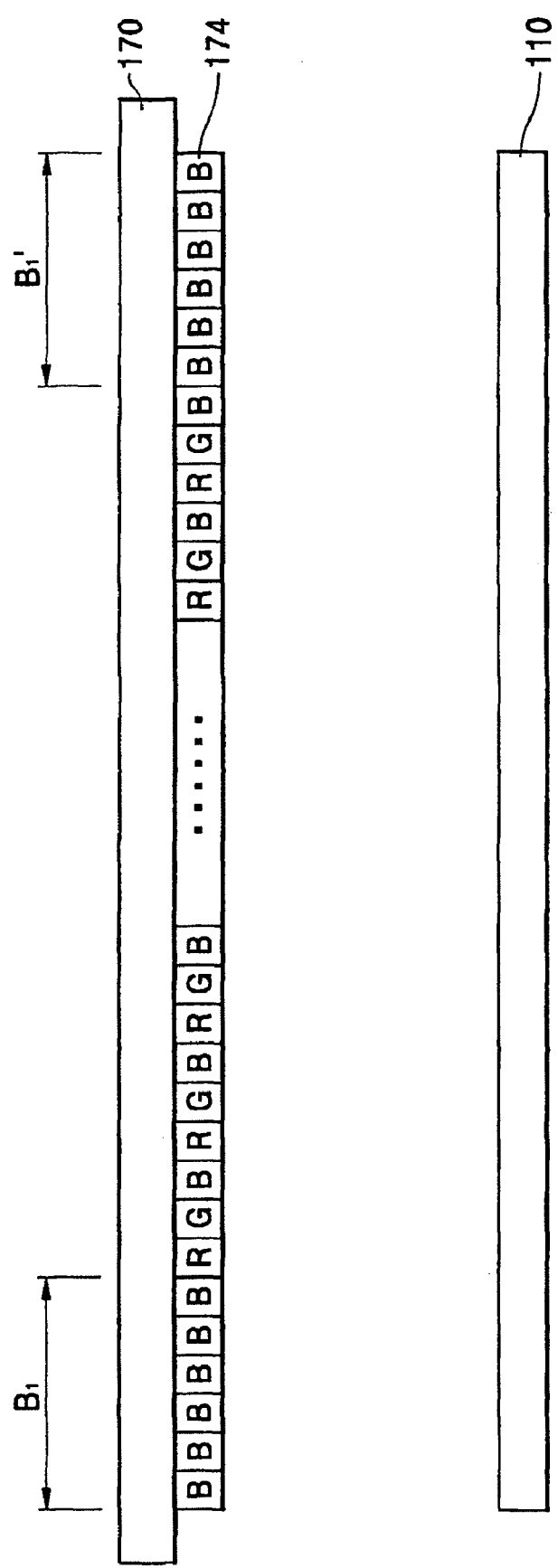
FIG. 7 is a schematic view showing an LCD panel on which color filters are formed so as to display the borderline according to a first exemplary embodiment of the present invention.

According to a third method, the common electrode 176 is not formed on portions of the color filter substrate 170 corresponding to the borderline by using another photo mask. Thus, when electric field is not formed on the liquid crystal disposed on portions corresponding to the border area, it is possible to display the borderline having a predetermined color:

FIG. 7 is a schematic view showing an LCD panel on which color filters are formed so as to display the borderline according to a first exemplary embodiment of the present invention.

Referring to FIG. 7, blue (B) color filter is formed on portions (B1, B1') of the color filter substrate 170 corresponding to the border area so as to display a borderline having a blue color. As shown in FIG. 7, the borderline can be displayed by using one layer of color filters.

According to above mentioned method, when signals, such as image data, are not applied to the pixels disposed on portions of the TFT substrate 110 corresponding to the border area, the light that transmits the liquid crystal disposed on portions corresponding to the border area passes through the blue color filter (B), to thereby display the borderline having blue color.

Figure 8:
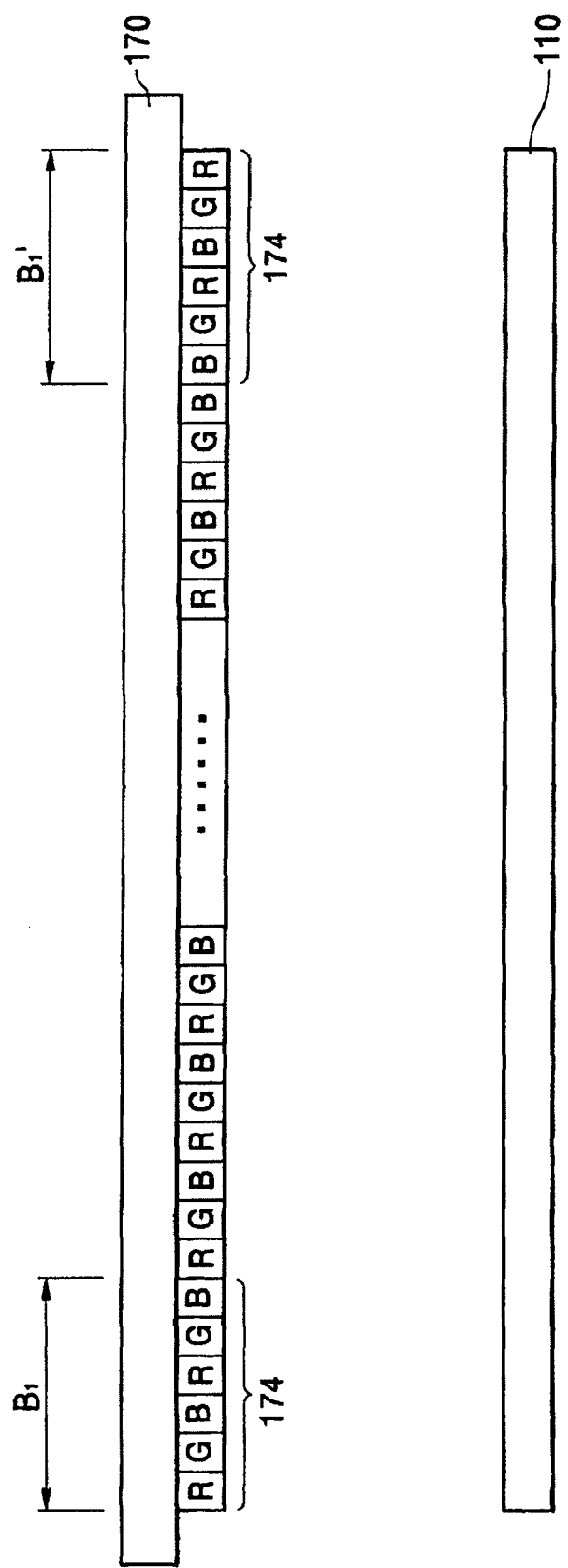
FIG. 8 is a schematic view showing an LCD panel on which color filters are formed so as to display the borderline according to a second exemplary embodiment of the present invention.
Figure 9:
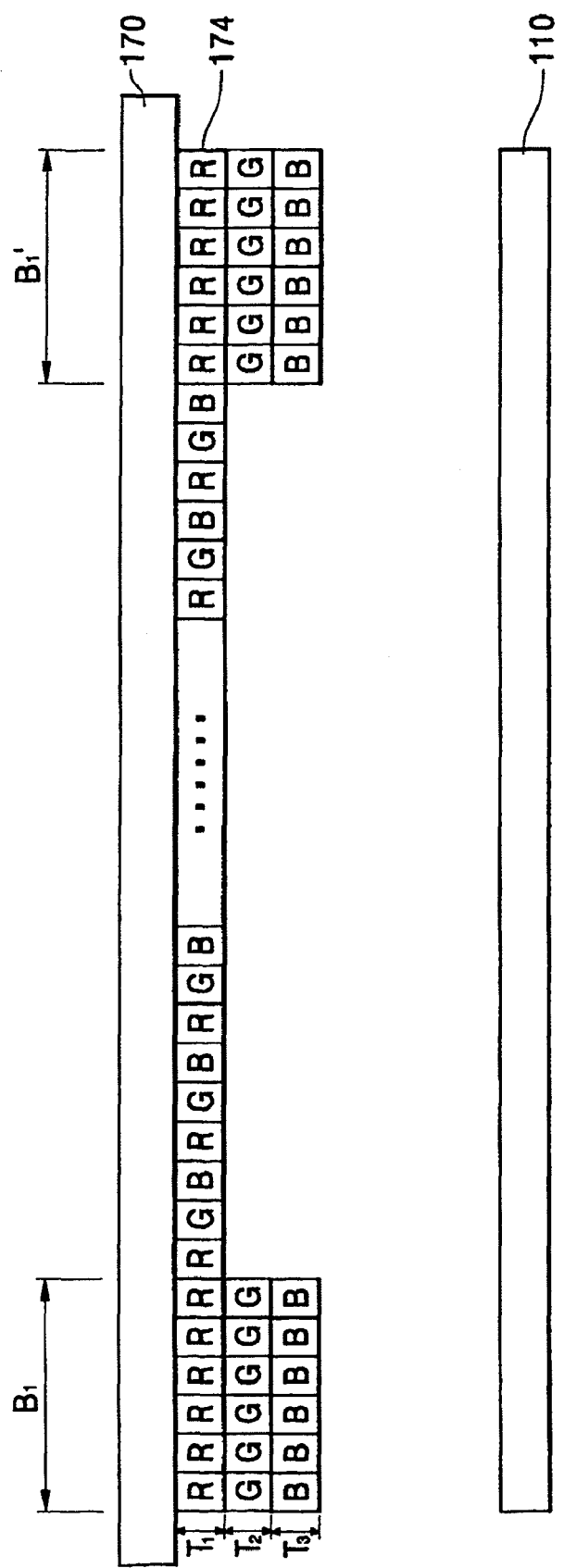
FIG. 9 is a schematic view showing an LCD panel on which color filters are formed so as to display the borderline according to a third exemplary embodiments of the present invention.

FIG. 8 is a schematic view showing an LCD panel on which color filters are formed so as to display the borderline according to a second exemplary embodiment of the present invention, FIG. 9 is a schematic view showing an LCD panel on which color filters are formed so as to display the borderline according to a third exemplary embodiment of the present invention.

Referring to FIG. 8, red (R), green (G) and blue (B) color filters are formed on portions (B1, B1') of the color filter substrate 170 corresponding to the border area so as to display a borderline having a predetermined color. As shown in FIG. 8, for example, the borderline having a white color can be displayed by using one layer of color filter that is alternatively arranged on portions (B1, B1') of the color filter substrate.

On the other hand, as shown in FIG. 9, the thickness (T1, T2, T3) of each of the color filters can be the same, or different from each other. In other words, a borderline having desired color(s) can be formed by varying the thickness of the color filter. The thickness of the color filter can be regulated by varying a coating thickness of the color filter during spin coating process or coating process using a slit coater. The thickness of the color filter can be regulated through slit exposure process using a slit mask.

In other words, according to above mentioned method, when no signals, such as image data, is not transmitted to the pixels disposed on portions of the TFT substrate 110 corresponding to border area in the normally white mode, the light that transmits the liquid crystal disposed on portions corresponding to the border area passes through the R, G, B color filters, to thereby display a borderline having a white color or the other colors.

Figure 10:
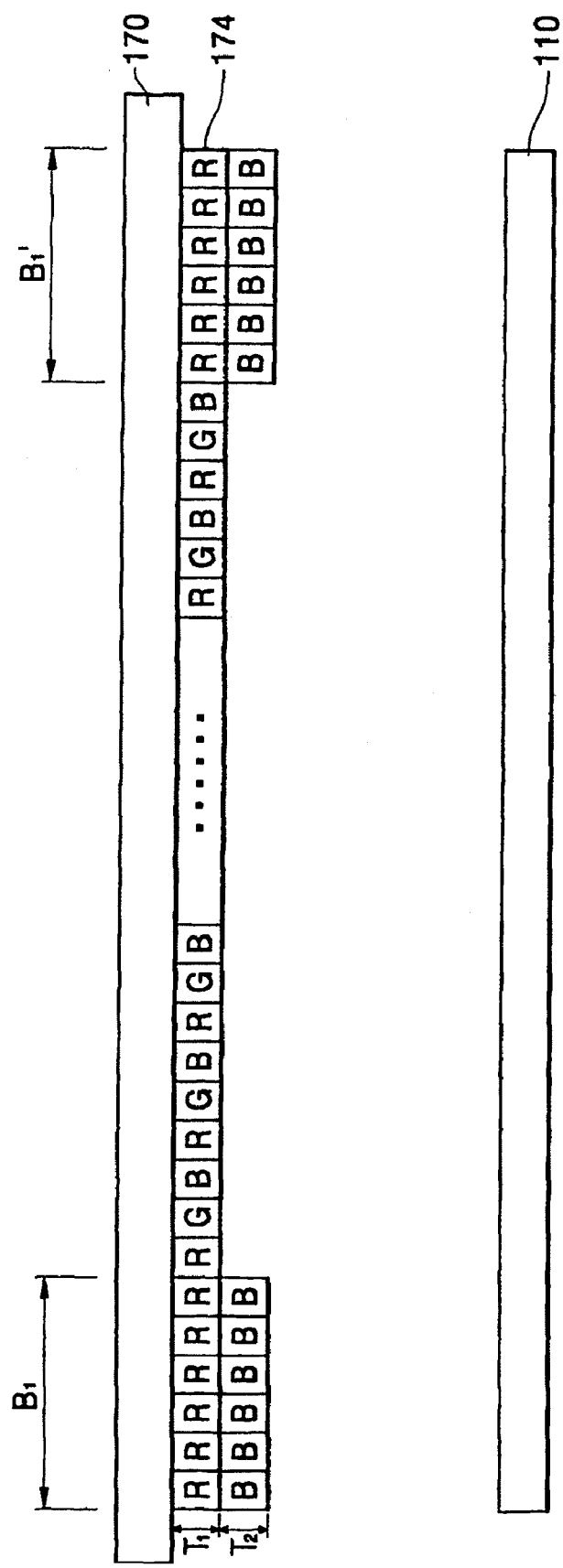
FIG. 10 is a schematic view showing an LCD panel on which color filters are formed so as to display the borderline according to a fourth exemplary embodiments of the present invention.

FIG. 10 is a schematic view showing an LCD panel on which color filters are formed so as to display the borderline according to a fourth exemplary embodiments of the present invention.

Referring to FIG. 10, two layers of red (R) and blue (B) color filters are formed on portions (B1, B1') of the color filter substrate 170 corresponding to the border area so as to display a borderline having a predetermined color. As shown in FIG. 10, the borderline having a predetermined color can be displayed by using two layers of color filters.

When two layers of color filters are used, the thickness (T1, T2) of each of the color filters can be the same, or different from each other.

Figure 11:
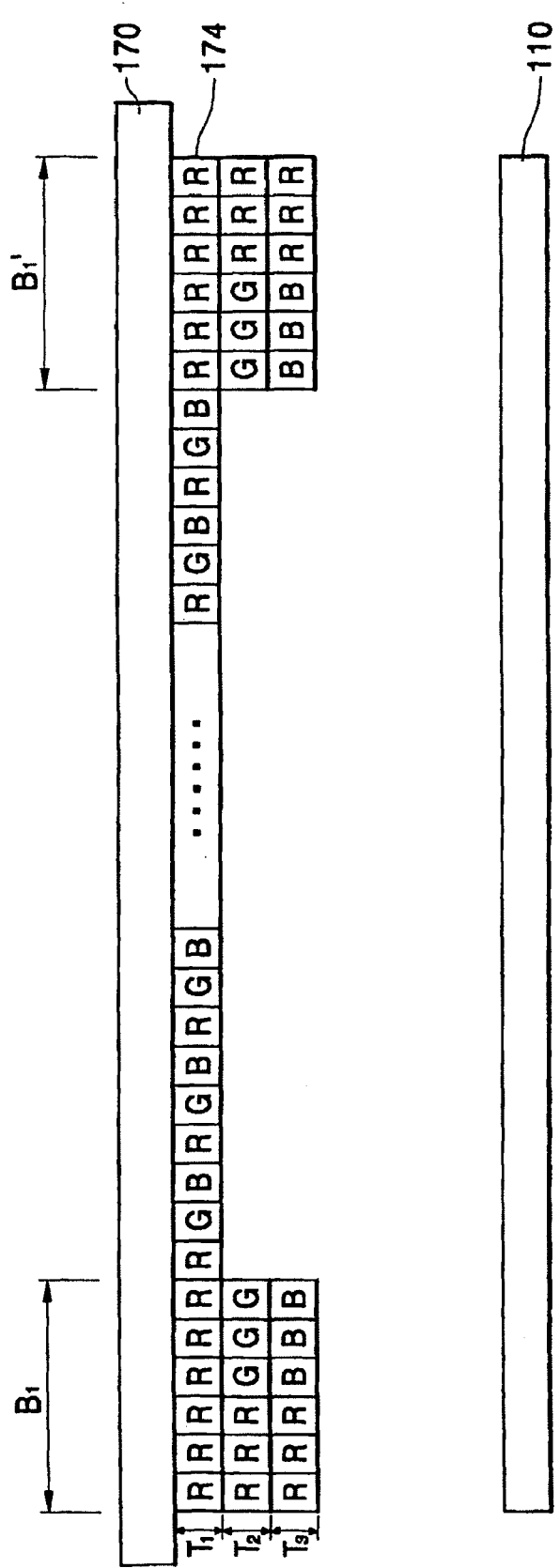
FIG. 11 is a schematic view showing an LCD panel on which color filters are formed so as to display the borderline according to a fifth exemplary embodiments of the present invention.

FIG. 11 is a schematic view showing an LCD panel on which color filters are formed so as to display the borderline according to a fifth exemplary embodiments of the present invention.

Referring to FIG. 11, three layers of color filters are formed on portions (B1, B1') of the color filter substrate 170 corresponding to the border area so as to display a borderline having two colors. As shown in FIG. 8, for example, the borderline having two colors can be displayed by using two layers of color filters. The thickness (T1, T2, T3) of each of the color filters can be the same, or different from each other. As shown in FIG. 11, for example, a borderline having two colors except red color can be formed by varying the thickness of red (R) color filters and the thickness of other color filters. The borderline having two colors can be displayed by means of one layer of color filters or two layers of color filters.

Although above preferred exemplary embodiments discuss the liquid crystal display device, the method for displaying the borderline could also be applied to the flat panel display device such as the electroluminescent display device, the plasma display panel and field emission display device.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A flat panel display apparatus comprising:
a first substrate;
a second substrate having a common electrode;
a thin film transistor formed on the first substrate;
a display area having a first area and a second area on the first substrate, the first area having a borderline and located in a border of the display area, wherein a zero electric field is maintained between the borderline and the common electrode to completely transmit light.

2. The flat panel display apparatus of claim 1, wherein the flat panel display apparatus is in a normally white mode.

3. The flat panel display apparatus of claim 2, wherein a display color of the first area is predetermined by a first color filter on a first portion of the second substrate corresponding to the first area without changing.

4. The flat panel display apparatus of claim 3, wherein the display color of the first area is white.

5. The flat panel display apparatus of claim 4, further comprising a gate electrode of the borderline, wherein the gate electrode is connected to a ground.

6. The flat panel display apparatus of claim 5, wherein the borderline has a top borderline, a bottom borderline, a left borderline and a right borderline.

7. The flat panel display apparatus of claim 4, further comprising a drain electrode and a pixel electrode of the borderline, wherein the drain electrode is not electrically connected to the pixel electrode.

8. The flat panel display apparatus of claim 7, wherein the borderline has a top borderline, a bottom borderline, a left borderline and a right borderline.

9. The flat panel display apparatus of claim 4, wherein the borderline has no thin film transistor.

10. The flat panel display apparatus of claim 9, wherein the borderline has a top borderline, a bottom borderline, a left borderline and a right borderline.

11. The flat panel display apparatus of claim 4, wherein the common electrode is not formed on the first portion of the second substrate corresponding to the first area.

12. The flat panel display apparatus of claim 11, wherein the borderline has a top borderline, a bottom borderline, a left borderline and a right borderline.

13. The flat panel display apparatus of claim 2, wherein a display color of the first area is white.

14. The flat panel display apparatus of claim 13, wherein the borderline has a top borderline, a bottom borderline, a left borderline and a right borderline.

15. The flat panel display apparatus of claim 2, wherein the borderline has a top borderline, a bottom borderline, a left borderline and a right borderline.

16. The flat panel display apparatus of claim 15, wherein the first color filter on a first portion of the second substrate corresponding to the first area is different from a second color filter on a second portion of the second substrate corresponding to the second area.

17. The flat panel display apparatus of claim 2, wherein the first color filter on a first portion of the second substrate corresponding to the first area is different from a second color filter on a second portion of the second substrate corresponding to the second area.

18. The flat panel display apparatus of claim 1, wherein the borderline has a top borderline, a bottom borderline, a left borderline and a right borderline.

19. The flat panel display apparatus of claim 18, further comprising a gate electrode of the borderline, wherein the gate electrode is connected to a ground.

20. The flat panel display apparatus of claim 18, further comprising a drain electrode and a pixel electrode of the borderline, wherein the drain electrode is not electrically connected to the pixel electrode.

21. The flat panel display apparatus of claim 18, wherein the borderline has no thin film transistor.

22. The flat panel display apparatus of claim 18, wherein the common electrode is not formed on a first portion of the second substrate corresponding to the first area.

23. The flat panel display apparatus of claim 1, wherein a display color of the first area is white.

* * * * *